(12) United States Patent
Henninge

(10) Patent No.: US 11,974,678 B2
(45) Date of Patent: May 7, 2024

(54) CUSHIONED FURNITURE RESTORATION KIT

(71) Applicant: Pierre Heroux, South Burlington, VT (US)

(72) Inventor: Paul C. Henninge, Burlington, VT (US)

(73) Assignee: Pierre Heroux, South Burlington, VT (US)

(*) Notice: Subject to any disclaimer, the term of this patent is extended or adjusted under 35 U.S.C. 154(b) by 222 days.

(21) Appl. No.: 17/722,758

(22) Filed: Apr. 18, 2022

(65) Prior Publication Data

US 2023/0012911 A1    Jan. 19, 2023

Related U.S. Application Data

(60) Provisional application No. 63/223,268, filed on Jul. 19, 2021.

(51) Int. Cl.
| | |
|---|---|
| *A47C 7/46* | (2006.01) |
| *A47B 96/20* | (2006.01) |
| *A47C 19/02* | (2006.01) |
| *A47C 31/00* | (2006.01) |
| *B60N 2/62* | (2006.01) |
| *B60N 2/66* | (2006.01) |
| *B60N 2/68* | (2006.01) |

(52) U.S. Cl.
CPC .............. *A47C 7/462* (2013.01); *A47B 96/20* (2013.01); *A47C 7/46* (2013.01); *A47C 19/027* (2013.01); *A47C 31/00* (2013.01); *B60N 2/62* (2013.01); *B60N 2/667* (2015.04); *B60N 2/686* (2013.01)

(58) Field of Classification Search
CPC .. A47C 7/185; A47C 7/20; A47C 7/35; A47C 7/425; A47C 7/46; A47C 7/462; A47C 7/465; B60N 2/667; B60N 2/6671; B60N 2/6673; B60N 2/686; B60N 2/62
USPC ......... 297/284.1, 284.2, 284.3, 284.4, 284.5, 297/284.8, 284.11
See application file for complete search history.

(56) References Cited

U.S. PATENT DOCUMENTS

| | | | | |
|---|---|---|---|---|
| 3,596,990 A | * | 8/1971 | Gottfried | A61G 5/00 297/284.8 |
| 3,810,264 A | * | 5/1974 | Mueller | A47C 19/024 5/220 |
| 4,627,661 A | * | 12/1986 | Ronnhult | B60N 2/667 297/284.4 |
| 4,685,733 A | * | 8/1987 | Machate | A47C 7/46 297/303.3 |

(Continued)

FOREIGN PATENT DOCUMENTS

WO    WO-0165977 A2 * 9/2001 ............. A47C 19/02

*Primary Examiner* — David E Allred
(74) *Attorney, Agent, or Firm* — Andrus Intellectual Property Law, LLP

(57) ABSTRACT

A furniture restoration kit comprising a support board enclosed within a vinyl casing and received on opposite ends by a first and second rigid cuffs. An adjustable brace comprises a first and second brace arm each configured to connect to one of a first and second rigid cuff and a tensioning mechanism. A tensioning mechanism provides a connection between each opposite pair of brace arm and rigid cuff and is configured to exert an inward force reducing the distance between opposite rigid cuffs in order to flex the support board outwards.

15 Claims, 8 Drawing Sheets

(56) References Cited

U.S. PATENT DOCUMENTS

| | | | | |
|---|---|---|---|---|
| 4,993,164 A * | 2/1991 | Jacobsen | ............... | A47C 7/46 |
| | | | | 297/284.4 |
| 5,026,116 A * | 6/1991 | Dal Monte | ............ | B60N 2/666 |
| | | | | 297/284.4 |
| 5,174,526 A * | 12/1992 | Kanigowski | ......... | B60N 2/6671 |
| | | | | 297/284.4 |
| 5,299,851 A * | 4/1994 | Lin | ............... | A47C 7/425 |
| | | | | 297/284.4 |
| 5,397,164 A * | 3/1995 | Schuster | ............ | B60N 2/6671 |
| | | | | 297/284.4 |
| 5,462,335 A * | 10/1995 | Seyler | ............... | B60N 2/66 |
| | | | | 297/284.4 |
| 5,651,584 A * | 7/1997 | Chenot | ............... | B60N 2/667 |
| | | | | 297/284.4 |
| 6,186,594 B1 * | 2/2001 | Valiquette | ............ | A61G 5/1091 |
| | | | | 297/284.4 |
| 6,572,190 B2 * | 6/2003 | Koepke | ............... | A47C 7/282 |
| | | | | 297/284.7 |
| 6,918,884 B2 * | 7/2005 | Knelsen | ............... | B60N 2/66 |
| | | | | 297/284.4 |
| 8,517,469 B1 * | 8/2013 | Hetzel | ............... | A61G 5/1067 |
| | | | | 297/284.4 |
| 9,078,527 B2 | 7/2015 | Pettingill et al. | | |
| 9,661,935 B2 | 5/2017 | Maggard et al. | | |
| 9,824,573 B1 * | 11/2017 | Beres | ............... | A47C 7/723 |
| 2004/0108760 A1 * | 6/2004 | McMillen | ............ | B60N 2/6671 |
| | | | | 297/284.4 |
| 2006/0103222 A1 * | 5/2006 | Caruso | ............... | A47C 7/16 |
| | | | | 297/452.1 |
| 2006/0244293 A1 * | 11/2006 | Buffa | ............... | B60N 2/6671 |
| | | | | 297/284.4 |
| 2007/0228789 A1 * | 10/2007 | McMillen | ............ | B60N 2/665 |
| | | | | 297/284.4 |
| 2010/0140999 A1 * | 6/2010 | Kladde | ............... | B60N 2/181 |
| | | | | 297/340 |
| 2010/0264708 A1 * | 10/2010 | Rajaratnam | ............ | A47C 7/282 |
| | | | | 297/410 |
| 2011/0062757 A1 * | 3/2011 | Colja | ............... | B60N 2/6671 |
| | | | | 297/284.3 |
| 2015/0110986 A1 * | 4/2015 | Peavey | ............... | F16B 12/10 |
| | | | | 428/57 |
| 2016/0242564 A1 * | 8/2016 | Cass | ............... | A47C 21/00 |
| 2019/0329685 A1 * | 10/2019 | Seibold | ............... | B60N 2/99 |

\* cited by examiner

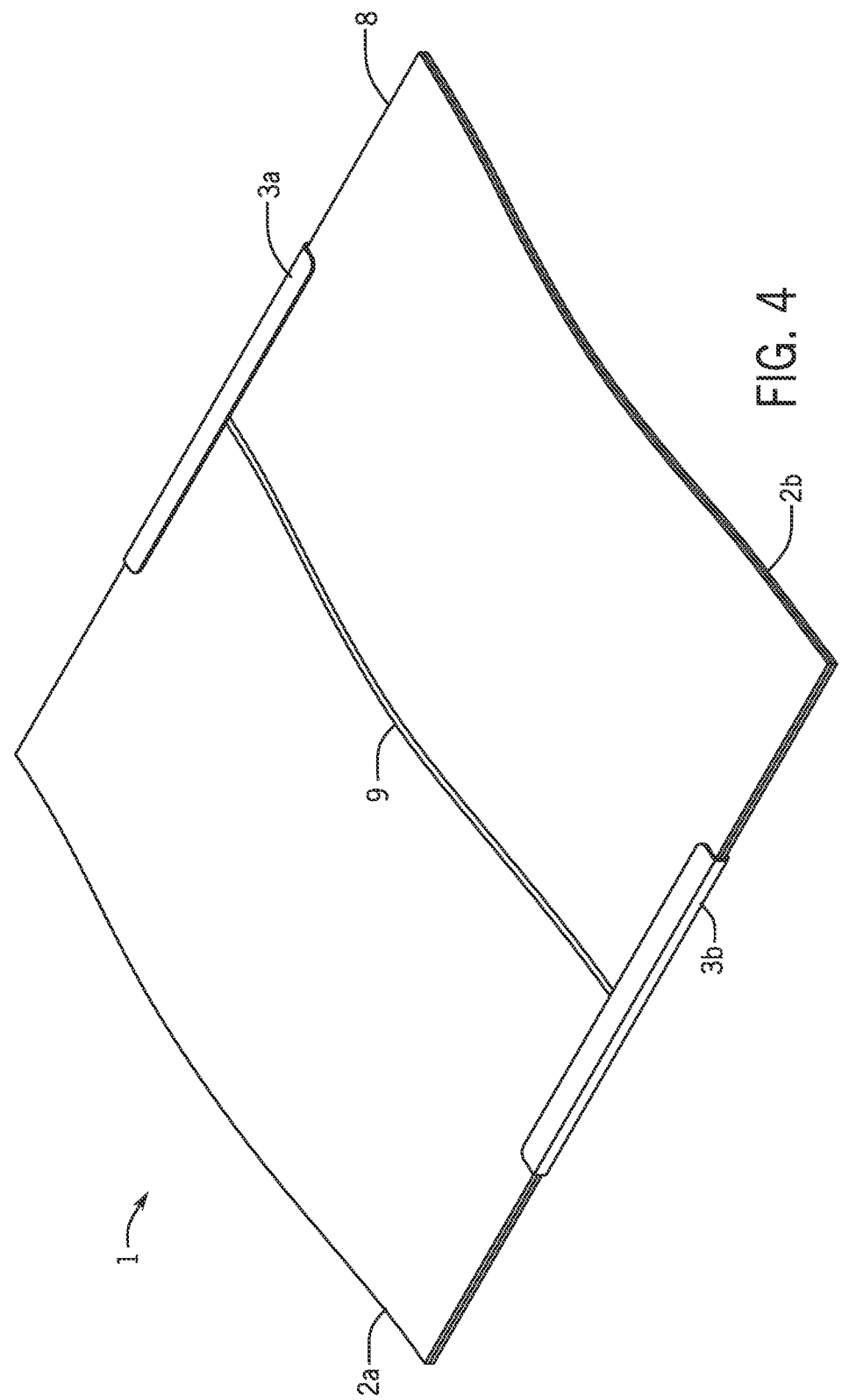

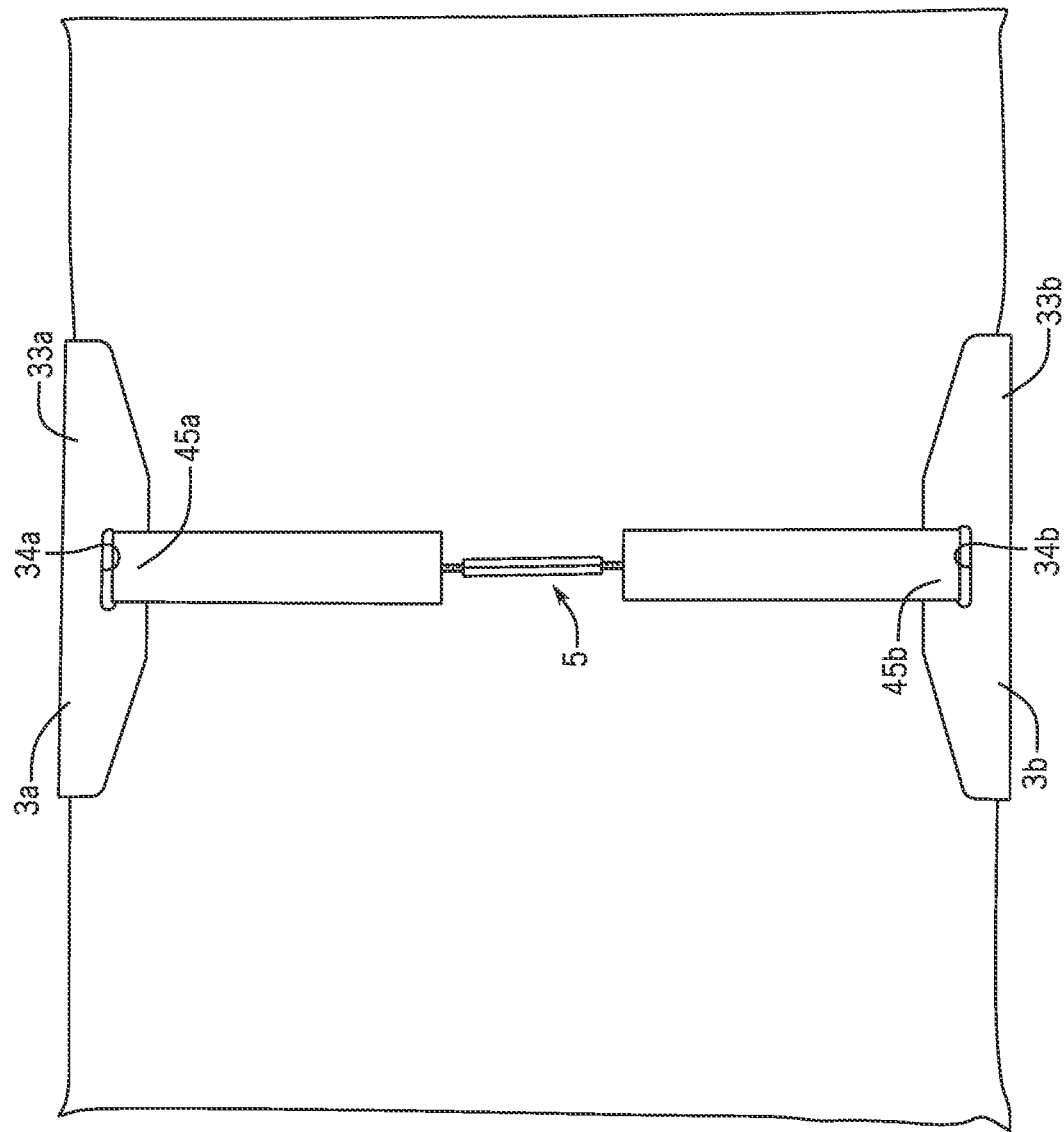

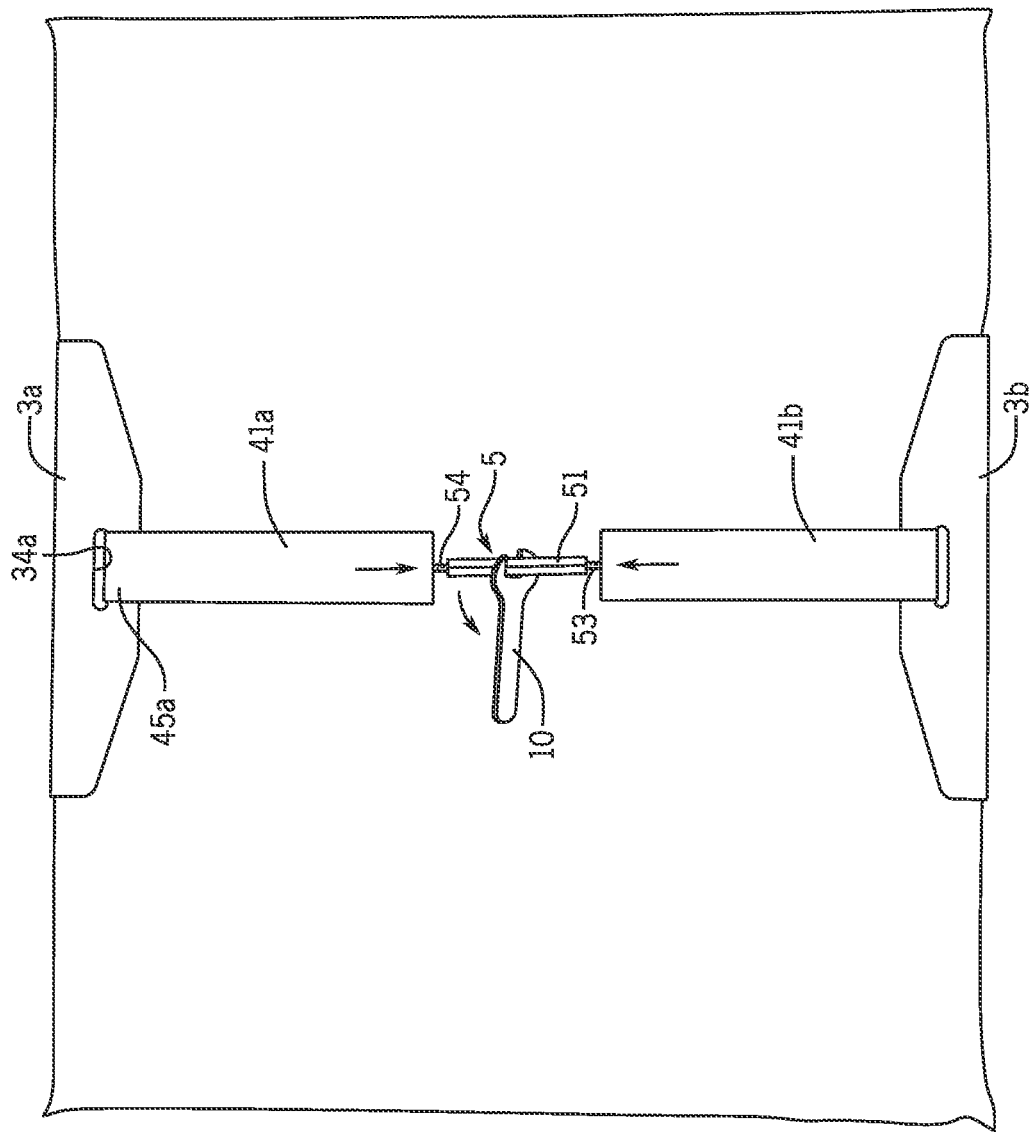

CUSHIONED FURNITURE RESTORATION KIT

CROSS-REFERENCE TO RELATED APPLICATION

The present application claims priority of U.S. Provisional Patent Application No. 63/223,268, filed Jul. 19, 2021, the content of which is incorporated herein by reference in its entirety.

FIELD OF THE INVENTION

The invention pertains to the restoration of sofas and chairs with sagging, indented cushions.

BACKGROUND

Sofa cushions are not made to last forever. When in use, sofa cushions are repeatedly compressed and overtime the repeated compressive force causes cushions to deform. Sofa cushions tend to become less elastic, flattened, and compressed over time. In addition, cushions are often left with an indentation that causes the sofa cushion to appear concave or deflated which is not appealing to most consumers and may not be comfortable. In some instances, the underlying cushion support springs or webbing in the sofa may become damaged, which also results in an uncomfortable seating arrangement and a less than desirable furniture appearance. In the past, flat support boards have been used under cushions to rehabilitate a sofa with worn springs, frame or webbing. Flat support boards do not, however, address sagging cushions with a concave or deflated indentation.

The present invention combats these issues by providing a solution to restore sofas and their cushions to near their original appearance, with the cushion and frame having a firm, restored shape. An object of the present invention is to provide consumers an alternative to purchasing new sofas or custom-made sofa cushions, both of which can be expensive. Another object of the present invention is to restore the aesthetic appearance and functionality of a sofa cushion by improving the durability and form of the sofa via restoration. Additional objects of the present invention include reinforcing sofa support members in order to prevent further damage to the frame of the furniture, providing adjustable levels of reinforcement to account for variable levels of wear and tear, providing lift to the cushion in order to make standing up from the cushion easier, and providing restored seating comfort.

While the invention is primarily described as being used to restore sofas and sofa cushions, the present invention can be used to restore chairs with cushioned seats as well.

SUMMARY

The invention is directed to a furniture restoration kit or system that incorporates one or more support boards and an adjustable brace to flex the one or more support boards upward from the brace. The brace and the bowed one or more support boards are then placed on the frame of the sofa, or chair, under the cushion in order to provide robust support on the frame while the bowed support surfaces accommodate sag in the cushion so that the top of the cushion appears relatively flat.

In an exemplary embodiment, the furniture restoration system includes a first and second support board, a vinyl casing including a seam such that the first support board is encapsulated by the vinyl covering on a first side of the seam, and the second support board is encapsulated by the vinyl covering on a second side of the seam. A pair of rigid cuffs, preferably made of sheet metal, are configured to receive opposite ends of the support boards in their vinyl encasement such that the cuffs are secured around opposite ends of the first and second support boards along the seam, which enables the first and second support boards to operate as a single unit. An adjustable brace comprises a first brace arm and a second brace arm, each preferably made of sheet metal, and a tensioning mechanism configured to connect a first end of a first brace arm to a first end of a second brace arm. Configured on the end of the first and second brace arms opposite the tensioning mechanism are means for attachment to the first and second rigid cuffs. Preferably, the means for attachment to the first and second rigid cuffs comprises a hook on the end of the respective brace arm, and a slot in each of the first and second rigid cuffs for receiving the hook on the respective brace arm. In a preferred embodiment, the tensioning mechanism configured to connect the first and second brace arms comprises a hex nut body with a first threaded shaft extending longitudinally from one side of the hex nut body and second threaded shaft extending longitudinally from either side of the body. Each threaded shaft has external threads that attach to the respective first and the second brace arms, wherein one threaded shaft has left winding threads and the other has right winding threads so that upon tightening. With this configuration, when the nut is turned to tighten, both threaded shafts exert an inward tensioning force to draw the first and second brace arms together. A square nut body or other means of turning the tensioning mechanism, instead of a hex nut body, can also be used in accordance with the invention.

As mentioned, when the kit is assembled, the first and second support boards are encapsulated by the vinyl casing on either side of the seam, and the first and second rigid cuffs are positioned around opposite sides of the support boards along the seam of the vinyl covering. The first and second rigid cuffs are connected to one another via the adjustable brace, which includes the brace arms and the tensioning mechanism. When installing the kit, the hex nut is rotated, to pull the first and second brace arms together, thus reducing the distance between the first and second rigid cuffs. This tightening causes the support boards to bow outward. The bow is more pronounced along the seam inasmuch as the cuffs apply pressure along the seam but do not apply pressure along the distal portions of the support boards. The more the nut is tightened the higher the bow in the support boards. In the exemplary embodiment, the maximum bow height is about 1.25 inches.

The support boards and the adjustable brace are sized to fit on the sofa frame under the cushion, or on a chair frame under the cushion, and provide an easy to use, robust restoration kit to address the problem of sagging and indented cushions and/or damaged frames or springs in sofas or chairs. The customizable height adjustment provides a solution for cushions with varied levels of wear and tear. Furthermore, the rigid nature of the bracing members and cuffs provides added support for the structural frame of the sofa as well as durability of the system itself. In addition, the kit can be packaged in a relatively compact manner to facilitate shipping and storage of inventory.

BRIEF DESCRIPTION OF THE DRAWINGS

FIG. 4 is a perspective view of the top of an assembled exemplary embodiment of the present invention.

FIGS. 5A-5D shows steps of assembling the cushioned furniture restoration kit shown in FIGS. 1-4 for use on a cushioned sofa or chair.

DETAILED DESCRIPTION

This invention as shown in the Figures is a cushioned furniture restoration kit that is configured to provide customizable levels of height adjustment to support indented, sagging cushions in various pieces of furniture (e.g. sofas or cushioned chairs). The kit essentially comprises of one or more support boards, which are braced on either side by two rigid cuffs. The cuffs are configured to be tightened together via an adjustable brace and tensioning mechanism, which results in the support boards bowing upward. In the preferred embodiment, two support boards are enclosed within a vinyl casing, each on either side of a center seam.

Figure 1:
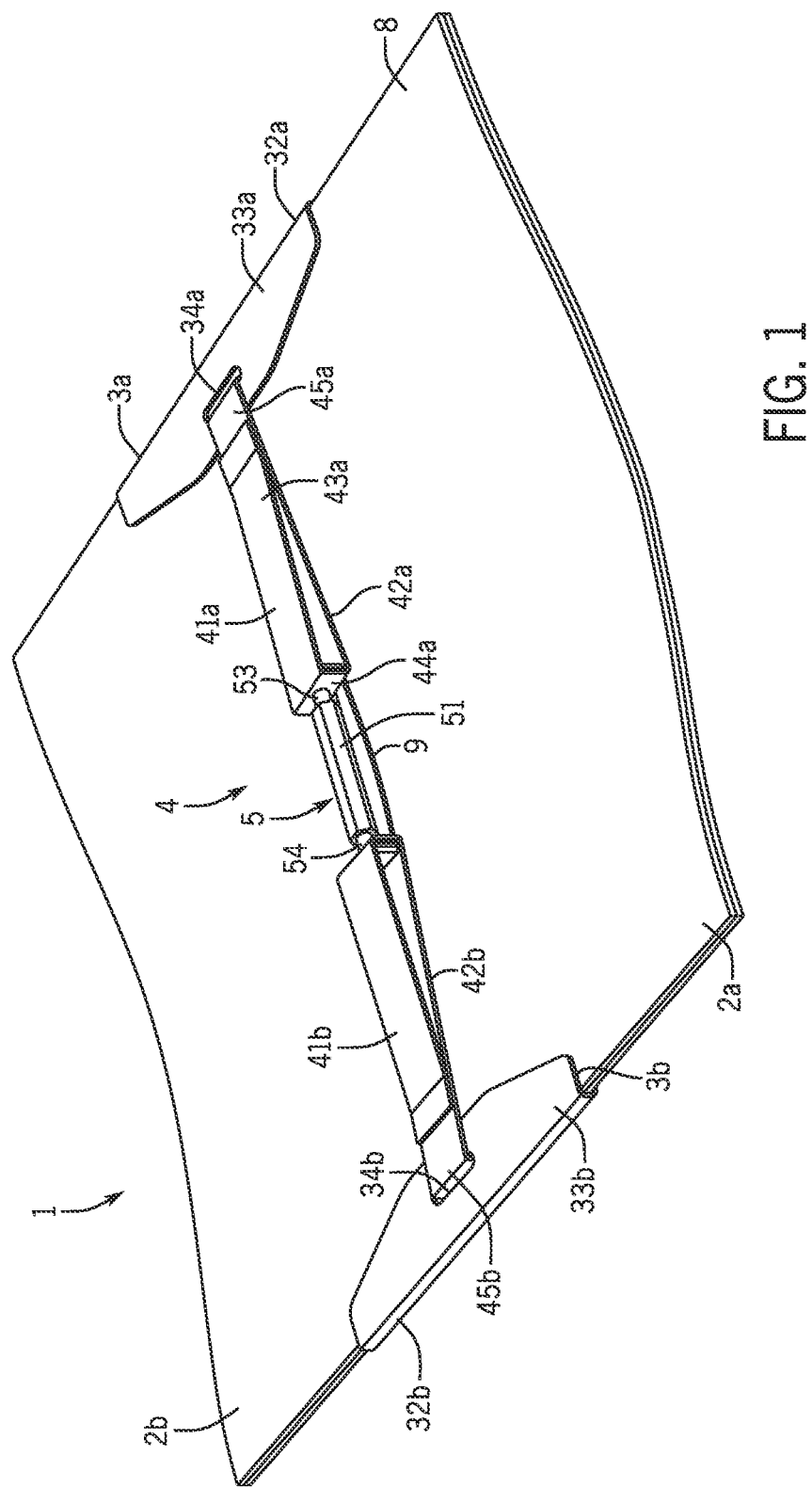
FIG. 1 is a perspective view of the underside of an assembled, cushioned furniture restoration kit constructed in accordance with an exemplary embodiment of the present invention.

FIG. 1 shows a perspective view of an exemplary embodiment of the assembled cushion restoration kit. The furniture restoration system 1 comprises a first 2a and second support board 2b encapsulated within a vinyl covering 8, see also FIGS. 5A-5D, on either side of a seam 9. Two rigid cuffs 3a, 3b, preferably made of sheet metal, are configured to receive opposite ends of the support boards 2a, 2b along the seam 9 such that the inner corners of the first 2a and second support boards 2b are held in the cuffs 3a, 3b. Attached to each of the first and second rigid cuffs 3a, 3b are first and second brace arms 41a, 41b each configured to receive opposite ends of a tensioning mechanism 5. The brace arms 41a, 41b together with the tensioning mechanism 5 constitute the adjustable brace 4. Upon tightening of the tensioning mechanism 5, the distance between the first 3a and second rigid cuffs 3b is reduced, causing the support boards 2a, 2b to bow outward as is shown most clearly in FIG. 3.

Figure 3:
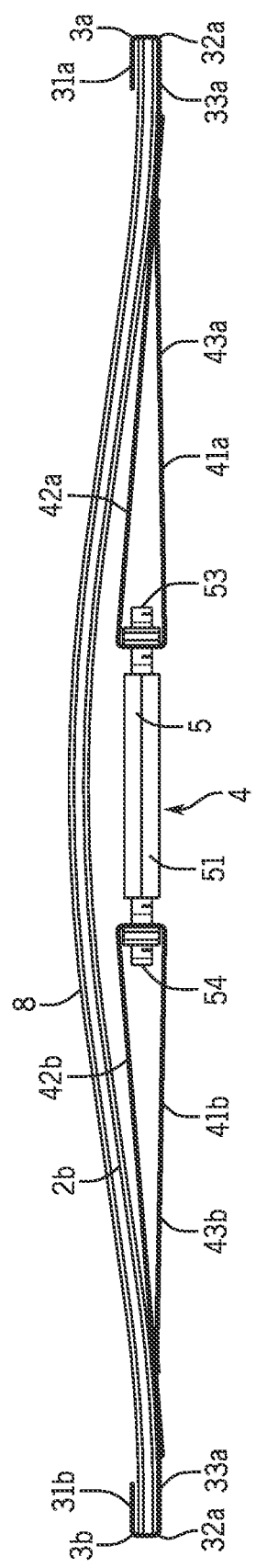
FIG. 3 is a modified side view of the exemplary embodiment of the invention schematically showing the tensioning mechanism tightened to bow the support boards.

FIG. 3 shows a modified side view of the exemplary embodiment illustrating the bow of the support boards 2a, 2b when the tensioning mechanism 5 is engaged and tightened. FIG. 3 demonstrates the bowed nature of the support boards 2a, 2b as well as the generally flat configuration of the adjustable brace 4 and rigid cuffs 3a, 3b. The support boards 2a, 2b are made of a flexible, resilient material which operates in a spring-like manner, such as wooden press board. It is a feature of the invention that the support boards 2a, 2b be durable enough to maintain its bowed form when the cushion or sofa is in use. The structure of the adjustable brace 4 ensures that the bow in the support boards 2a, 2b cannot invert, although the flexed support boards 2a, 2b are likely to compress slightly when a person sits on the cushion in use. In a preferred embodiment, the support boards 2a, 2b are wooden pressboard, which is preferable because of ease of manufacturing and affordability. In alternative embodiments the support boards 2a, 2b may be made of spring steel, resilient plastic such as polyurethane or polyethylene or other flexible, resilient material although these materials are not preferred commercially.

Figure 2:
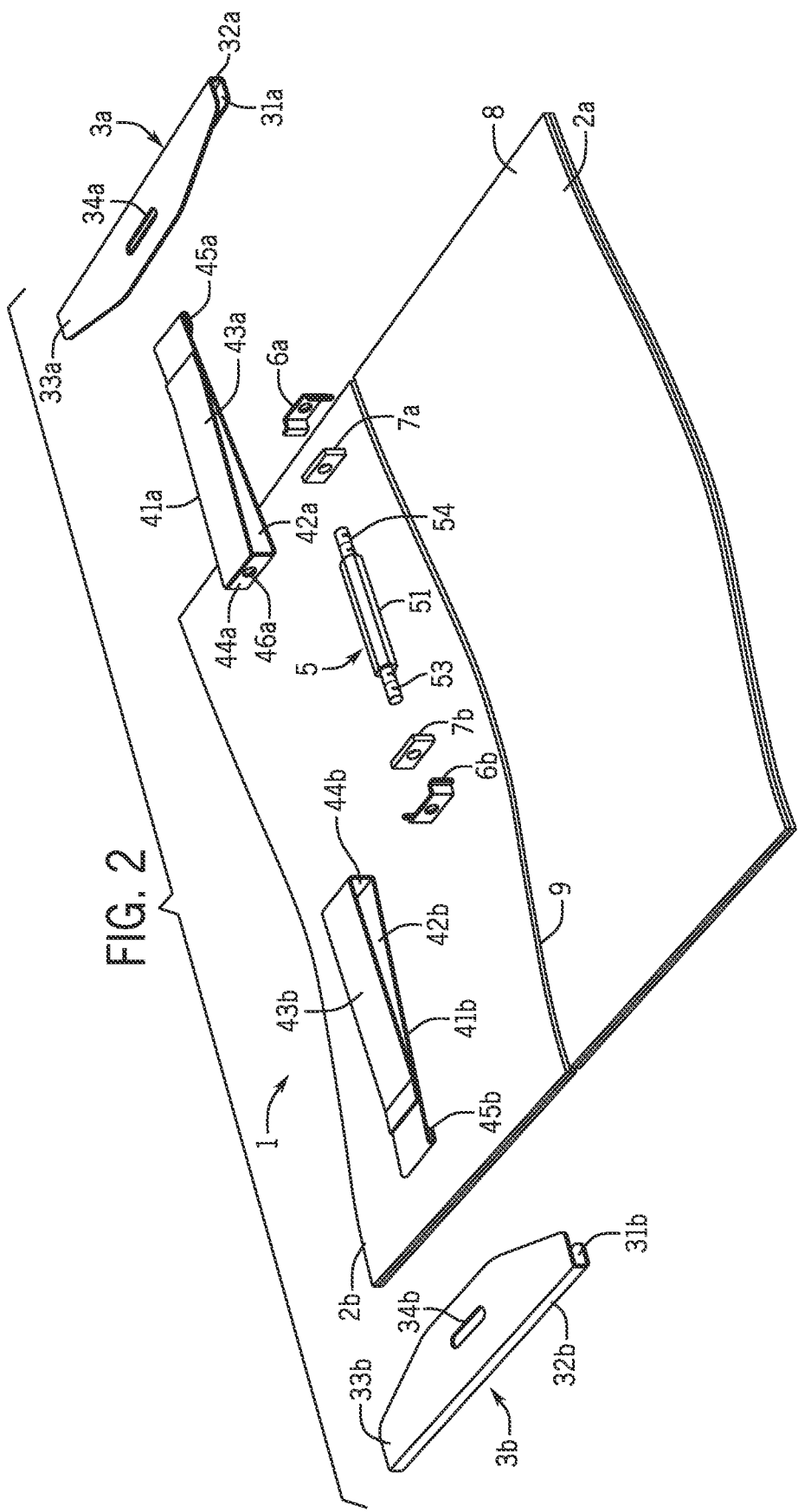
FIG. 2 is an exploded view of the exemplary embodiment of the cushioned furniture restoration kit shown in FIG. 1.

As is further shown in FIG. 3, the first 3a and second rigid cuffs 3b each comprise a first substantially flat surface 31a, 31b extending flush with a first surface of the respective support board 2a, 2b and a bent flange 32a, 32b connecting a second substantially flat return surface 33a, 33b extending flush with the opposite surface of the respective support board 2a, 2b. Referring also to FIGS. 2 and 4, it is a feature of the preferred embodiment that the first and second rigid cuffs 3 are approximately 6-7 inches wide and do not span the entire width of the support boards 2a, 2b. With this configuration, the tension force exerted by the first 3a and second 3b rigid cuffs is distributed onto along the center edges of the support boards 2a, 2b, leaving the distal ends less deformed when the system 1 is in use. This allows the bowed support boards 2a, 2b to have a gradual curvature that more naturally supports a center indentation in a cushion on sofa and restores the top surface of the cushion to flat or nearly flat. Furthermore, it is preferable that the rigid cuffs 3a, 3b are configured with rounded edges to reduce the likelihood of the cuffs 3a, 3b catching on the cushion or sofa and tearing the sub-upholstery.

Fig. shows an exploded view of the exemplary embodiment of the cushion restoration kit 1 prior to assembly. FIG. 2 shows the first 3a and second 3b rigid cuffs, as well as the means for tensioning 5 that connects to the first 41a and second 41b brace arms. The first rigid cuff 3a is attached to the first brace arm 41a, and the second rigid cuff 3b is attached to the second brace arm 41b. It is conceivable that each pair of rigid cuffs 3a, 3b and brace arms 41a, 4b be manufactured as an integral unit, although it is preferred that the cuffs 3a, 3b and the brace arms 41a, 41b be manufactured as separate physical components. In the preferred embodiment, the rigid cuffs 3a, 3b and brace arms 41a, 41b are made of sheet metal and are removably attached to one another. It is easier to produce the rigid cuffs 3a, 3b and brace arms 41a, 41b separately and it also allows for the rigid cuffs 3a, 3b to be produced with a thicker sheet metal than the brace arms 41a, 41b. This reinforcement with a thicker material is preferable because the rigid cuffs 3 serve as the primary load bearing member of the support configuration. The means for attachment is preferably a slot 34a, 34b positioned on each of the first 3a and second 3b rigid cuffs for receiving a hook 45a, 45b located on the top section 42a, 42b of each of the first and second brace arms 41a, 41b. It is conceivable that the placement of the hooks 45a, 45b and slots 34a, 34b are interchangeable between the cuffs 3a, 3b and brace arms 41a, 41b, although this structure is not preferred.

As is shown clearly in FIG. 2, the adjustable brace 4 comprises first 41a and second 41b brace arms connected to opposite sides of the tensioning mechanism 5. Each brace arm 41a, 41b comprises a top 42a, 42b longitudinally extending section, and a bottom longitudinally extending portion 43a, 43b. A vertical fastening section 44a, 44b connects the top 42a, 42b longitudinally extending section to bottom longitudinally extending section 43a, 43b. Each vertical fastening section 44a, 44b has a hole 46a, 46b through which the respective threaded shaft 53, 54 passes. A first threaded insert 7a and first retainer cap 6a is attached the first brace arm 41a behind the vertical fastening section 44a and receives the first threaded shaft 53. A second threaded insert 7b and second retainer cap 6b is attached the second brace arm 41b behind the vertical fastening section 44b and receives the second threaded shaft 54. In FIG. 2, the support boards 2a, 2b are straight inasmuch as the support board 2a, 2b are not under tension.

Referring to FIG. 3, the bottom longitudinally extending section 43a, 43b on each brace arm 41a, 41b tapers toward the top longitudinally extending section 42a, 42b as it extends away from the vertical fastening section 44a, 44b. It is preferable that end of the top section 42a, 42b opposite the vertical fastening section 44a, 44b be bent into a hook 45a, 45b and attached in the slot 34a, 34b of the respective cuff 3a, 3b. It is a feature of this invention that the rigid cuffs 3a, 3b, adjustable brace arms 41a, 42b, and tensioning mechanism 5 lie in a fundamentally flat plane to reduce the tendency for the system to damage the sub-upholstery of the sofa it lays upon. Each hook 45a, 45b is preferably configured as part of the respective brace arms 41a, 41b, such that the end of the top section 42a, 42b is bent to produce a return section to secure the hook 45a, 45b in the respective cuff slot 34a, 34b.

At the same end as the hook 45a, 45b, it is preferable that the end of the bottom longitudinally extending section 43a, 43b of the brace arm 41a, 41b is welded to the top longitudinally extending section 42a, 42b. This configuration delimits a triangular space, which can be seen clearly in FIG. 3, that is structurally stable and desirable for receiving the tightening mechanism 5, threaded insert 7a, 7b, and retainer cap 6a, 6b while insulating the cushion or sofa sub-upholstery from potential interactions with tensioning mechanism 5 that may lead to tears or damage.

The tensioning mechanism 5 in the exemplary embodiment of the invention is best shown in FIGS. 2 and 3. The tensioning mechanism 5 can conceivably be any connecting device that allows for variable amounts of tension to be exerted onto each of the first 41a and second 41b brace arms in an inward direction. Example alternatives include an over-center cam buckle, a pulley system, adjustable vinyl straps, a turnbuckle and rod system. In the preferred embodiment, the tensioning mechanism 5 is configured of a hex nut body 51, with a first 53 and second 54 threaded shaft extending out of opposite sides of the hex nut body 51. It is essential in this embodiment that one of the first and second threaded shafts 53, 54 has right-hand winding external threads 53, and the opposite shaft has left-hand winding external threads 54. This ensures that the tensioning mechanism 5 exerts force pulling inwards from both sides of the body 51 when the body 51 is turned to tighten the tensioning mechanism 5. As mentioned above, the vertical fastening section 44a, 44b on each of the first 41a and second 41b brace arms comprises a bore 46a, 46b allowing for through passage of the first and second threaded shafts 53, 54. The vertical fastening section 44a, 44b on each brace arm 41a, 41b further interacts with a threaded insert 7a, 7b and retainer cap 6a, 6b aligned so that the threaded shaft 53, 54 passes first through the bore 46a, 46b, then engages with the threaded insert 7a, 7b, and finally passes through the retainer cap 6a, 6b on each of the brace arms 41a, 41b. It is preferable that the retainer cap 6a, 6b is tap welded to the vertical fastening section 44a, 44b to secure the threaded insert 7a, 7b in place. This reduces complications in assembly and alignment of the fastening members. Each of the threaded inserts 7a, 7b has internal threads for engaging with the respective right and left winding external threads 53 and 54. The threaded insert 7a, 7b is preferably made of a material that is softer than that of the retainer cap 6a, 6b and bracing arms 41a, 41b, such as mild or cold-rolled steel.

As shown in FIG. 3, when the brace arms 41a, 41b are in tension, the longitudinal axis of the hex nut 51 and threaded shafts 53, 54 lies in the same plane as the point of attachment of the cuffs 3a, 3b to the support boards 2a, 2b. In addition, the bottom longitudinally extending section 43a, 43b of the brace arms 41a, 41b lie generally parallel and slightly below the hex nut 51 which protects the hex nut 51 and or the threaded shafts 53, 54 from getting caught in the sub-upholstery. Further, the top longitudinally extending section 42a, 42b of the brace arms 41a, 41b are oriented angularly upward as the section extends from the hook toward the center tensioning mechanism 5. With this configuration, the support boards 2a, 2b can only flex in the upward direction when the tensioning mechanism 5 is tightened to pull the brace arms 41a, 41b and the cuffs 3a, 3b together.

FIG. 4 shows a perspective view of the top side of an assembled and tensioned cushion restoration system 1 according to an exemplary embodiment. This perspective view shows the positioning of each rigid cuff 3a, 3b on opposite sides of the seam 9 as well as the preferred relative length of each cuff 3a, 3b.

Figure 5A:
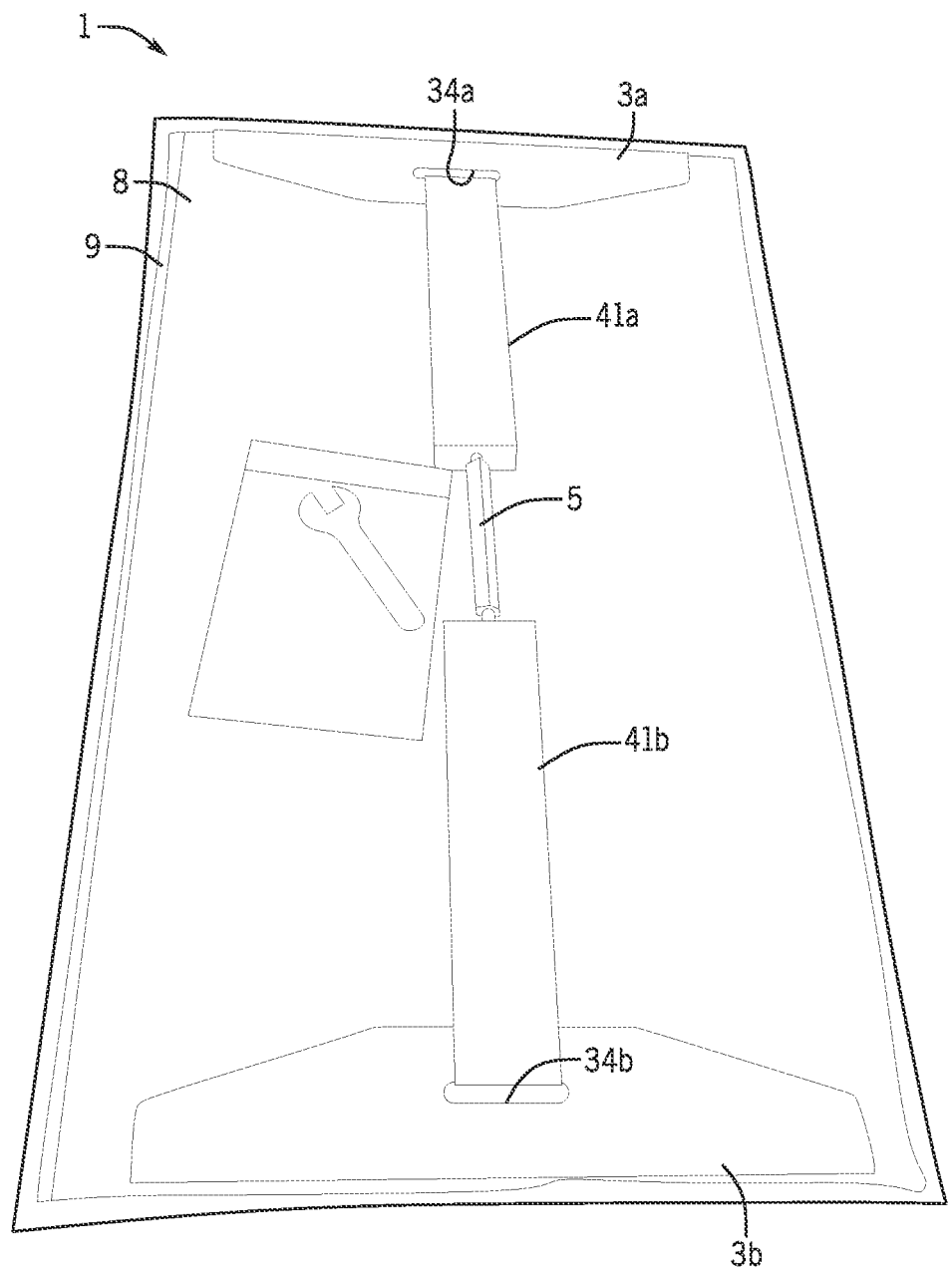

One feature of this invention is that the generally flat configuration allows for easy packaging, shipping, and assembly. FIGS. 5A through 5D demonstrate the steps for assembling the furniture restoration kit from shipping to tensioning. FIG. 5A show the kit 1 as packaged within a disposable wrapper. A disposable wrench 10 is included. When shipped, the first and second support boards 2a, 2b remain within the vinyl covering 8, which is folded along the seam 9 so that the support boards 2a, 2b lay on top of one another. In a preferred embodiment, the one or more support boards 2a, 2b each span about 17.5 inches long and are about 10 inches wide, which allows for convenient shipping purposes, as well as matches the standard frame width on common couches, sofas, and other furniture. As shown in FIG. 5A, the first 3a and second 3b rigid cuffs are secured around the first support board 2a in the packaging when the kit is shipped, but the tensioning mechanism 5 is relatively loose. The width of the cuffs 3a, 3b is less than the width of the first 2a, 2b and second support boards 2. The adjustable brace 4 including tensioning mechanism 5 and the first 41a and second 41b brace arms are connected to the respective first 3a and second 3b rigid cuffs.

Figure 5B:
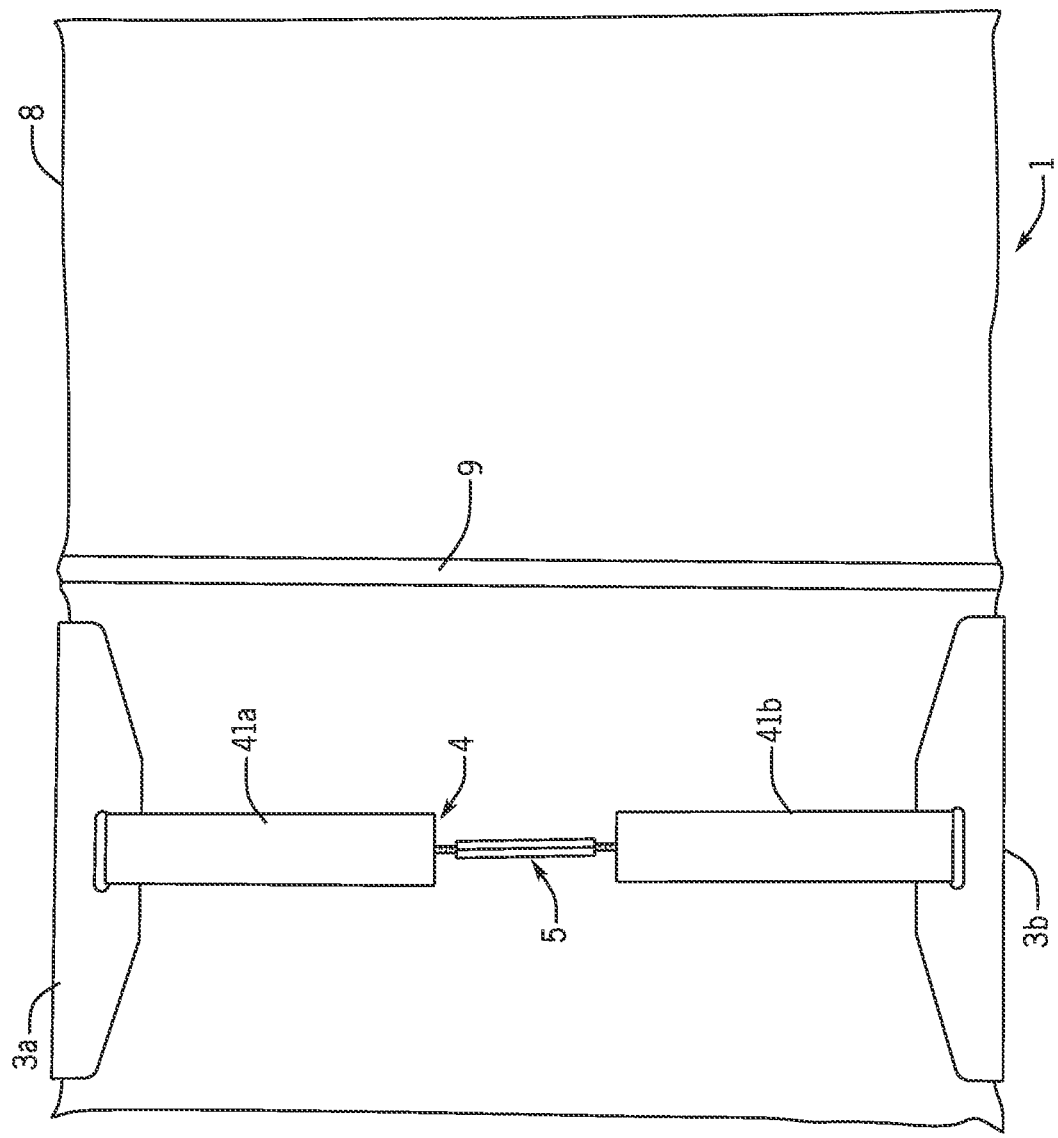

To assemble the furniture restoration kit 1, a user must first remove the wrapper and unfold the first and second support board 2 so that they lie flat as is shown in FIG. 5B. Then, the first 3a and the second 3b rigid cuffs are shifted to be centered over the seam 9 and to position the cuffs 3a, 3b around both inner corners of the first and second support boards 2 as is shown in FIG. 5C. FIG. 5D shows the final step in providing a customizable lift for the cushion in need of restoration. The user engages the tensioning mechanism 5 and tightens until the bow of the support boards 2a, 2b reaches a desired height. In the shown embodiment, the tensioning mechanism 5 has a hex nut body 51 that is turned by the wrench 10, which in turn rotates the external threads 53a, 53b to pull the first 41a and second 41b brace arm together and bow the support boards 2a, 2b outward. The extent to which the tensioning mechanism 5 is tightened and the support boards 2a, 2b are bowed is adjustable to fit the desired height of reinforcement for the cushion in need.

FIG. 4 shows an assembled perspective view of the kit following user assembly. The assemble kit 1 as shown in FIG. 4 is then placed on the sofa frame below the cushion.

In the exemplary embodiment of the invention shown in the Figures, the first and second rigid cuffs are separate physical components from the brace arms and are configured to attach to one of the respective first and second brace arms. In the preferred embodiment, the means for attaching comprises a hook formed at the end of each of the first and second brace arms, and a slot in each cuff for receiving the respective hook. This configuration, as mentioned above, provides a relatively flat undersurface at the connection point, eliminating protrusions that could potentially damage the sub-upholstery of the furniture being restored. The slot can be placed on the brace and with the hook on the cuff, although this is not as desirable. Alternative means of attachment include screws, rivets, pin connectors, etc. It is also possible within the scope of the invention for the rigid cuff to be formed integrally with the respective brace arm. As mentioned, constructing the cuffs and the brace arms as separate physical components enables the cuffs to be made of a thicker, stronger sheet of metal, and also enables some play between the components prior to tensioning which may be helpful during assembly.

In the exemplary embodiment of the invention, the tensioning mechanism comprises a hex nut body with two threaded shafts extending from either end, each threaded shaft configured to attach to the respective first and second brace arms. Instead of a hex nut body, a square nut body or other means of turning the tensioning mechanism can also be used in accordance with the invention. It is important in the exemplary embodiment of the invention that one of the threaded shafts has right-hand winding external threads and the other has left-hand winding external threads to enable for the brace to apply an inward tensioning force upon rotation of the nut body.

Alternatively, the tensioning mechanism which connects and applies tension to the first and second brace arms can be a cam buckle, a pulley and wheel system, adjustable vinyl straps, a turnbuckle and rod system, or an adjustable belt, although the hex nut with threaded shafts has been found to be robust and easy to user and to manufacture.

The invention claimed is:

1. A furniture restoration system comprising:
first and second support boards;
a first rigid cuff and a second rigid cuff;
an adjustable brace comprising a first brace arm, a second a brace arm, and a tensioning mechanism that is configured to attach to the first and second brace arms and adjustably vary the distance between the brace arms; and
a covering to encapsulate the first and second support boards;
wherein the first cuff is attached to the first brace arm and the second cuff is attached to the second brace arm; and
wherein the covering includes a seam to allow for folding such that the first support board is encapsulated by the covering on a first side of the seam and the second support board is encapsulated by the covering on a second side of the seam, and further wherein the each of the first and second rigid cuffs are configured to receive opposite ends of the first support board and opposite ends of the second support board and tightening of the tensioning mechanism causes a middle portion of both the first and the second support boards to flex away from the adjustable brace.

2. The system of claim 1, wherein the first and second rigid cuffs each comprise a first substantially flat surface, a second substantially flat return surface and a bent flange connecting the first and second substantially flat surfaces and delimiting a receiving space for a respective one of the support boards.

3. The system of claim 2, wherein the first and second brace arms each comprise a means for attachment to one of the first and second rigid cuffs.

4. The system of claim 3, wherein the first and second rigid cuffs are made of a thicker material than the first and second brace arms.

5. The system of claim 3, wherein said means on the brace arms for attachment to one of the first and second rigid cuffs comprises a hook on the respective brace arm, and the first and second rigid cuffs each further comprise a slot for receiving the hook on the respective brace arm.

6. The system of claim 2, wherein the first and second rigid cuffs are made of sheet metal.

7. The system of claim 3, wherein the first and second brace arms are made of sheet metal.

8. The system of claim 1, wherein the first and second brace arms each comprise a bottom section, vertical receiving section, and top section;
wherein the vertical receiving section connects the bottom section and the top section and is configured to receive the tensioning mechanism.

9. The system of claim 8, wherein the bottom section of each brace arm tapers toward the top section as the top section extends away from the vertical receiving section.

10. The system of claim 9, wherein the top section of each brace arm comprises a hook for connecting to a slot in one of the first and second rigid cuffs.

11. The system of claim 10, wherein the bottom section is tap welded to the top section of each brace arm.

12. The system of claim 1, wherein the tensioning mechanism comprises
a nut body; and
a first and a second threaded shaft extending from each side of the nut body;
wherein the threaded shafts have external threads for attachment to each of the first and the second brace arms, such that one shaft is right winding and the other is left winding.

13. The system of claim 8, wherein a means for securing the tensioning mechanism to each of the first and the second brace arms comprises:
a threaded insert; and
a retainer cap; and
the vertical receiving section further comprises a bore for through passage of a respective one of the threaded shafts;
wherein each of the first and second threaded shafts pass first through the bore on each of the vertical receiving sections, then engage with the threaded insert, and finally pass through the retainer cap.

14. The system of claim 13, wherein the retainer cap is tap welded to the vertical receiving section to secure the threaded insert in place.

15. The system of claim 1, wherein the covering is a vinyl covering.

* * * * *